March 14, 1944.  C. H. SMITH  2,343,937
HYDRAULIC BUILT-IN JACK
Filed May 4, 1942  2 Sheets-Sheet 1
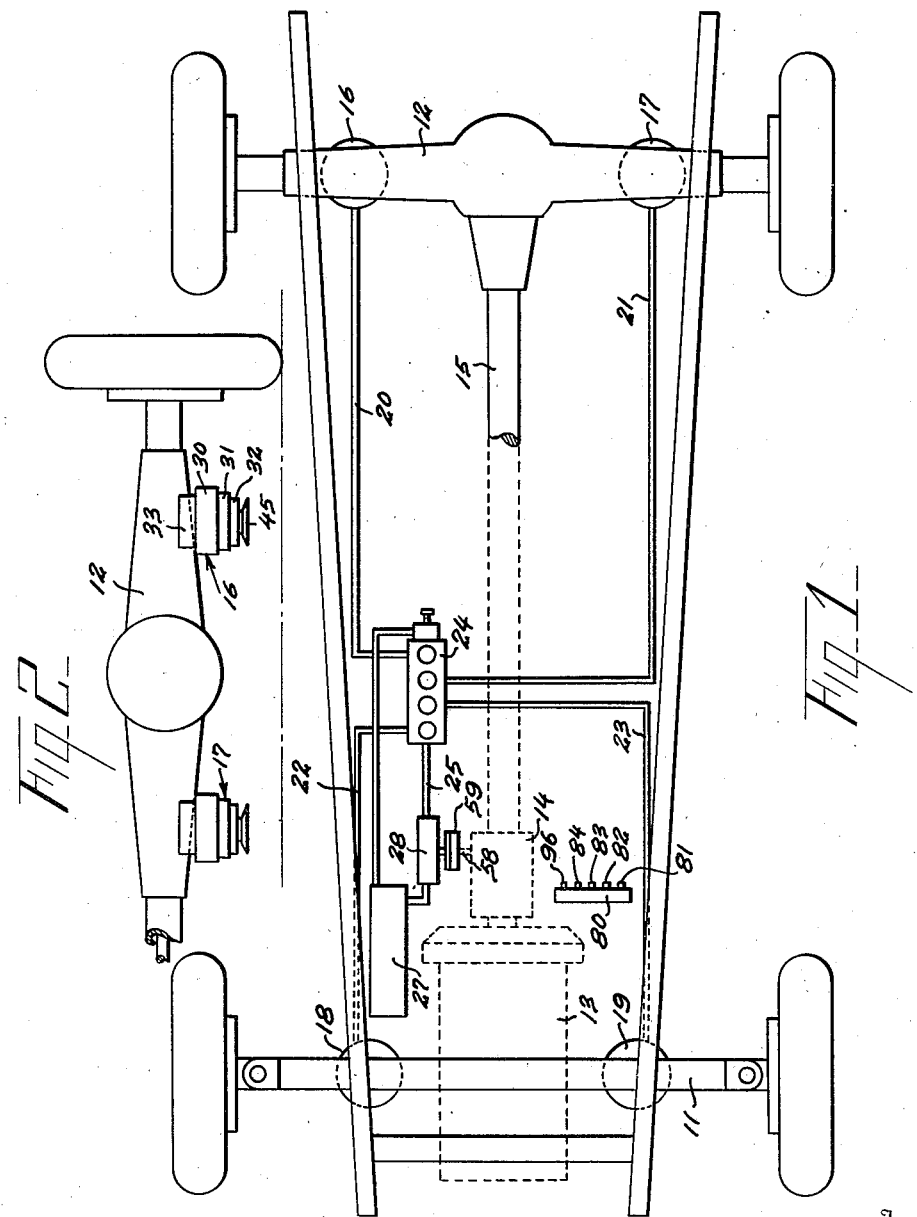
Clyde Harcourt Smith  Inventor
By Carl Miller  Attorney

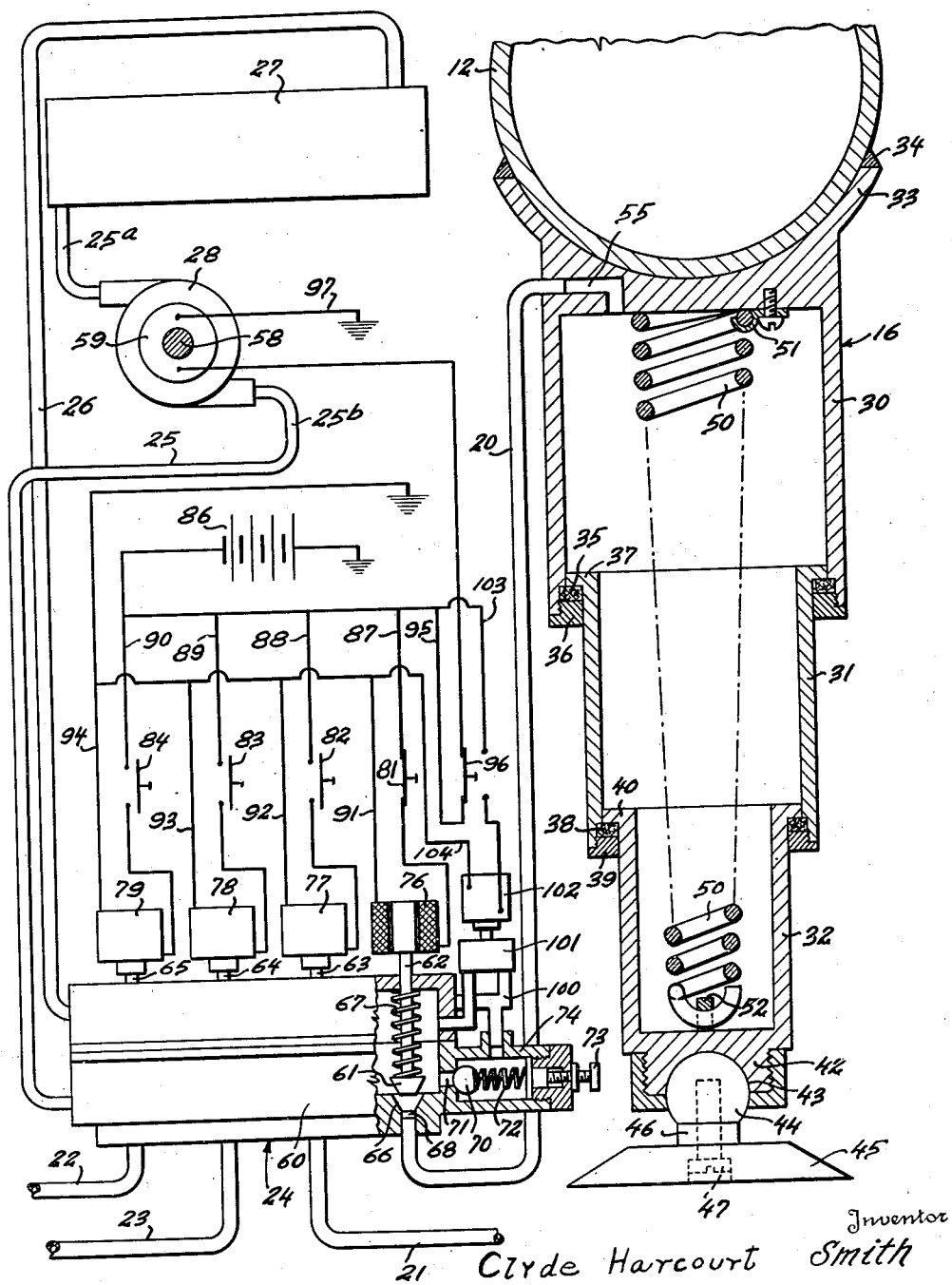

Patented Mar. 14, 1944

2,343,937

UNITED STATES PATENT OFFICE 2,343,937

HYDRAULIC BUILT-IN JACK

Clyde Harcourt Smith, Panama City, Panama

Application May 4, 1942, Serial No. 441,661

1 Claim. (Cl. 254—86)

This invention relates to a vehicle jacking system for raising one or more wheels of the vehicle.

The main object of this invention is to provide a simple and highly efficient hydraulic jack means mounted on a vehicle in proximity to all of its ground wheels and power operated from the vehicle engine, all of the jack means being connected to a common reservoir and valve housing and each jack means being selectively operated from the vehicle dash, there being further provided an electrical control system for the valve means and other operating parts of the hydraulic system.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Figure 1 is a plan view of an automobile or truck chassis showing hydraulic jack mounting, hydraulic mechanism and electric control.

Figure 2 is an elevational view of rear axle showing hydraulic jack mounting thereon.

Figure 3 is a sectional view through one of the hydraulic jacks mounted on the rear axle, showing same in extended operative position, and also showing diagrammatically the hydraulic operating and electrical control system therefor.

Referring to the drawings wherein like reference characters indicate like parts throughout, 10 denotes a vehicle chassis comprising a front axle 11, a rear axle 12, an engine 13, transmission 14 and drive shaft 15.

Carried by each axle and adjacent each of the wheels thereof are the hydraulic jacks 16, 17, 18 and 19, respectively connected by conduits 20, 21, 22 and 23 to a distributive chamber or valve housing 24, which in turn is connected by a delivery conduit 25 and return conduit 26 to a reservoir 27, there being interposed in the delivery conduit 26 a pump 28.

As each of the jacks are identical in construction a description of one will suffice. Referring to Figure 3 the jack 16 is shown to comprise three telescoping cylinders 30, 31 and 32. The outermost cylinder 30 is provided at its upper end which is closed with an arcuate flange 33 adapted to engage the underside of the rear axle housing 12 and is secured thereto by welding as at 34. The lower and open end of the cylinder 30 is provided with a packing 35 and guide sleeve 36 for guiding engagement with the cylinder 31. The intermediate cylinder 31 is open at both ends and is provided at its upper end with a radial flange 37 adapted to limit outward movement of the cylinder when it comes into engagement with the packing 35. At its lower open end the cylinder 31 is provided with a packing 38 and guide sleeve 39 similar to the packing and guiding sleeve of cylinder 30. The inner or lowermost cylinder 32 is open at its upper end which is provided with a limiting flange 40 adapted to engage the packing 38 of intermediate cylinder 31. The lower end of the cylinder 32 is closed and is provided with an integral reduced diameter threaded extension 42 provided with spherical bearing socket 43 adapted to receive the ball end 44 of the jack ground engaging abutment 45. The ball end 44 is provided with a stem 46 which is secured to the abutment 45 by the screw 47. A locking sleeve 48 fitted in the threaded extension 42 serves to retain the ball end 44 in bearing engagement with its socket 43. It is thus apparent that the abutment 45 is capable of assuming different positions depending on the contour of the ground. A tension coil spring 50 is arranged within the telescoping cylinders, and has its upper end secured by means of clips 51 (only one of which is shown) to the head end of the cylinder 30, the lower end of the spring 50 having hooked engagement with a lug 52 provided on the lower closed end of the cylinder 32. The coil spring 50 is so designed as to telescope the cylinders one into the other and to retain the same in their collapsed inoperative position such as shown in Figure 2.

With relation to the front axle 11 suitable means (not shown) connect the jacks 18 and 19 thereto. Each of the upper head ends of the outer cylinders 30 of the jacks are provided with a passage 55 for communication with the interior of the cylinders and to each of which the conduits 20, 21, 22, and 23 are respectively connected.

Suitably located on the chassis 10 is the reservoir 27 containing a suitable liquid for use in the hydraulic system such as oil or any other liquid medium having the characteristic of non-freezing and free flowing in all kinds of weather. A rotary pump 28 is driven by a power take off shaft 58 operable in a manner to be hereinafter described. It is to be understood that any type of pump and control therefor may be utilized and that the form shown herein and described is only for purposes of explanation. Connecting the reservoir 27 and pump 28 is one section 25a of the delivery conduit 25 the other section 25b thereof connecting the pump and the distributing chamber 24.

The valve housing 24 comprises a two-part casing 60 in which are positioned four valves only one of which is shown and as they all are identical only one will be described. This valve 61 is mounted on the end of a valve stem 62 which extends outwardly of the casing 60. The remaining valves are respectively carried by the stems 63, 64 and 65. The valve 61 is adapted to seat on a valve seat 66 and is normally held seated thereon by the coil spring 67. The valve seat 66 is formed on the inner end of a passage 68 in which is located one end of the conduit 20 the other end thereof being fitted in the passage 55 of the jack 16. In a like manner the other conduits 21, 22 and 23 connect the respective valve controlled passages with the passages in the jacks 17, 18 and 19. Thus, fluid delivered into the valve housing 24 is by-passed to the jacks when the valves are opened in the manner to be hereinafter described. In Figure 3, it is seen that the valve 61 is open so that the fluid is by-passed into the conduit 20 to be delivered into the cylinders of the jack 16 to expand or telescope the same outwardly thus rendering the jack functionally operative.

Provided in the valve casing 60 is a pressure relief ball valve 70 normally closing the passage 71 and held in this position by a spring 72 the tension of which may be adjusted by the screw 73, the whole being mounted in the pressure relief chamber 74. The return conduit 26 has one end connected to the chamber 74 and its other end with the reservoir 27, thus, when the cylinders of the jack 16 are fully expanded no more liquid can be delivered thereto. The back pressure thus set up opens the relief valve 70 against the adjusted tension of the spring 72 enabling the liquid delivered by the pump 28 to flow through passage 71 into the chamber 74 and out through return conduit 26 back to the reservoir. The relief valve 70 is operative regardless whether one, any number of or all the jacks are simultaneously placed into operation.

The jack operating valve 61 is operated by a solenoid 76 and the other jack valves are respectively operated by the solenoids 77, 78 and 79. Provided on the vehicle dash convenient to the operator is a switch panel 80 provided with switches 81, 82, 83, 84 respectively controlling the solenoids 76, 77, 78 and 79. Current is supplied from a battery 86 by conductors 87, 88, 89 and 90 to one terminal of the solenoids there being interposed in said conductors the switches 81, 82, 83 and 84, the other terminals being connected to a ground return by conductors 91, 92, 93 and 94.

A conductor 95 connects the battery with one terminal of the magnetic clutch 59 in which conductor is interposed a switch 96, the other terminal being connected to a ground return by a conductor 97. It is thus seen that by closing the pump switch 96 power is supplied from shaft 58 and magnetic clutch 59 to operate pump 59 which will supply liquid under pressure from the reservoir 27 to the valve housing 24. If all jack valves are closed the liquid under pressure in the valve housing will unseat relief valve 70 thus permitting the liquid to return to the reservoir through return conduit 26.

With the pump 59 in operation and assuming that it is desired to operate jack 16, the same is rendered functionally operative by closing switch 81 whereupon the solenoid 76 will be energized to move valve stem 62 and valve 61 upwardly off its seat 66 to thereby by-pass the liquid delivered into the valve housing 24 through the conduit 20 into the cylinders of the jack 16 to expand the same outwardly. During this operation the relief valve 70 will be closed and will only open again when the jack 16 is fully extended in the manner as hereinabove described. At the same time should it be desired to utilize any one of the other jacks, the same may be operated by the closing of the switch controlling the solenoid operating the valve controlling the operation of said jack.

When it is desired to permit a jack to contract or collapse to its inoperative position, it becomes necessary to remove from the extended jack a quantity of liquid. This is automatically accomplished by operation of the jack collapsing control. Provided in the valve casing 60 is a branch conduit 100 which communicates the interior of the valve housing with the return conduit 100. The branch conduit 100 is opened and closed by a spring pressed valve 101 that is operated by a solenoid 102. Current is supplied to one terminal of the solenoid 102 by a conductor 103, the other terminal being connected to a ground return by the conductor 104. Interposed in the conductor 103 is a pair of switch contacts adapted to be engaged by the switch element of the pump clutch switch 96. In fact the switch 96 is of the two-way type, in one closed position it closes the circuit to the magnetic switch 59 and in its other closed position it closes the circuit to solenoid 102. Thus to collapse the jack 16, the magnetic clutch circuit is broken by operation of the switch 96 which thus stops the pump 28 and the delivery of liquid to the valve housing 24. The switch 96 is then moved to its other position to close the circuit to solenoid 102 which thus becomes energized opening valve 101. The jack valve 61 is held open during this operation by keeping the switch 81 closed. As there is now no pressure in the hydraulic system the contracting force of coil spring 50 is sufficient to contract the cylinders 31 and 32, the liquid therein be forced back through conduit 20 into valve housing 24, through branch conduit 100 into return conduit 26 back to reservoir 27, this continuing until the cylinders of the jack 16 are completely collapsed and the jack assumes its inoperative position, see Figure 2. The switch 81 may then be opened and the entire system is now in inoperative position.

Having described the invention and the manner in which the same operates what is claimed is:

An hydraulic jack system for automotive vehicles comprising an hydraulic jack mounted on the vehicle adjacent each wheel, a reservoir containing a supply of fluid, a distributing chamber, a pump for delivering fluid under pressure from said reservoir to said distributing chamber, a power take-off shaft connected to the vehicle transmission for driving said pump, a magnetic clutch between said shaft and pump, a connection from said distributing chamber to each of said jacks, a solenoid operated valve for each connection operable within said distributing chamber, and remote control switch means for operating said clutch and for selectively operating said valves whereby to permit the delivery of said fluid either to all of said jacks, any selected group of said jacks or to any one selected jack, said distributing chamber including a pressure relief valve and a return connection to said reservoir whereby when a jack is completely extended the increased pressure in the fluid set up by the back pressure of the fluid in said jack will operate said relief valve to permit the flow of fluid back to said reservoir, means within said jacks for contracting the same, a solenoid operated return valve means in said return connection operable to permit a return of the fluid back to said reservoir when said jack is contracted to its inoperative position, a two-way pump clutch switch connected to said magnetic clutch and to said return valve solenoid, said switch in one closed position closing the circuit to said magnetic clutch and in its other closed position closing the circuit to said return valve solenoid and opening the circuit to said magnetic clutch.

CLYDE HARCOURT SMITH.